L. T. O'BRYAN, W. M. SILK, AND T. H. KIRK.
ART OF PACKING LEAF TOBACCO.
APPLICATION FILED AUG. 26, 1921.

L. T. O'BRYAN, W. M. SILK, AND T. H. KIRK.
ART OF PACKING LEAF TOBACCO.
APPLICATION FILED AUG. 26, 1921.

1,413,868.

Patented Apr. 25, 1922.
5 SHEETS—SHEET 2.

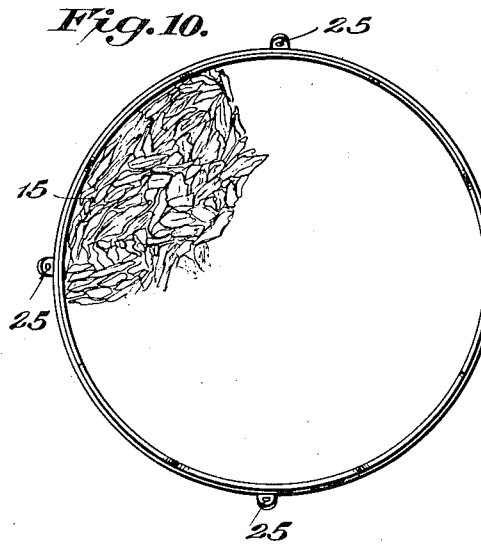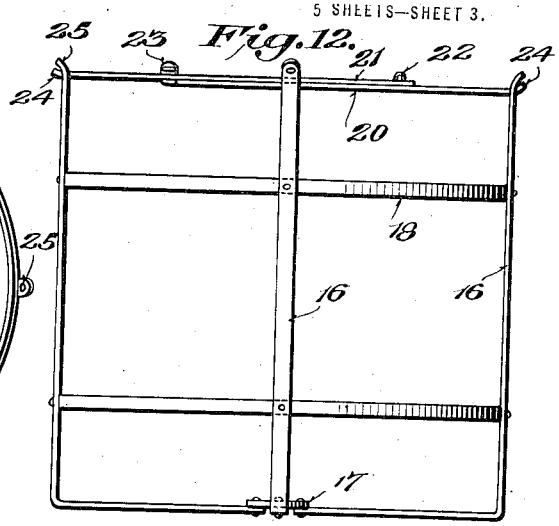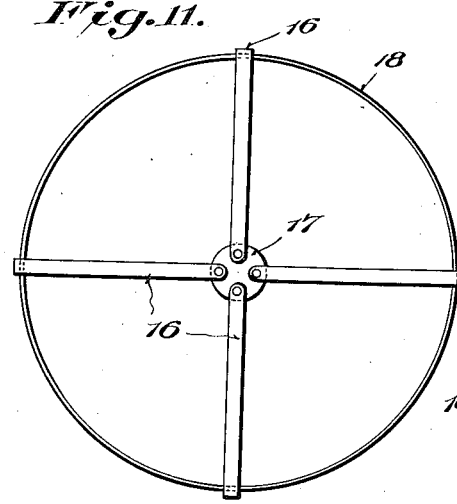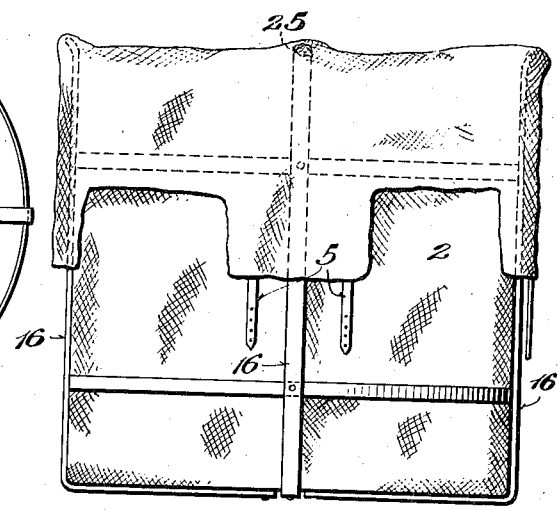

L. T. O'BRYAN, W. M. SILK, AND T. H. KIRK.
ART OF PACKING LEAF TOBACCO.
APPLICATION FILED AUG. 26, 1921.
1,413,868.
Patented Apr. 25, 1922.
5 SHEETS—SHEET 4.
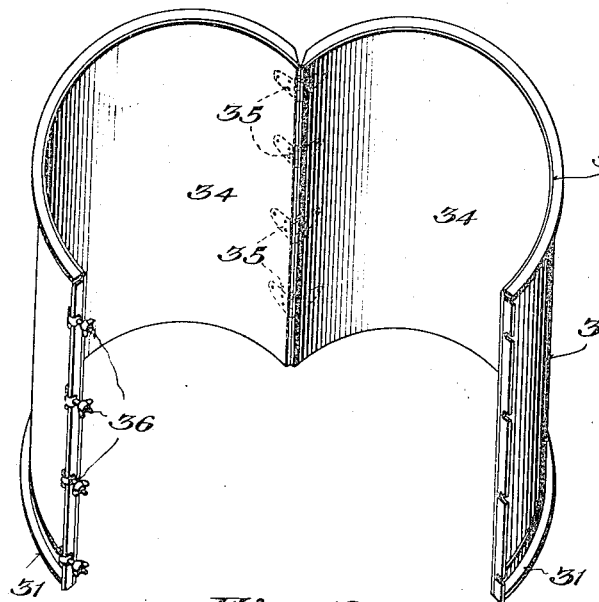
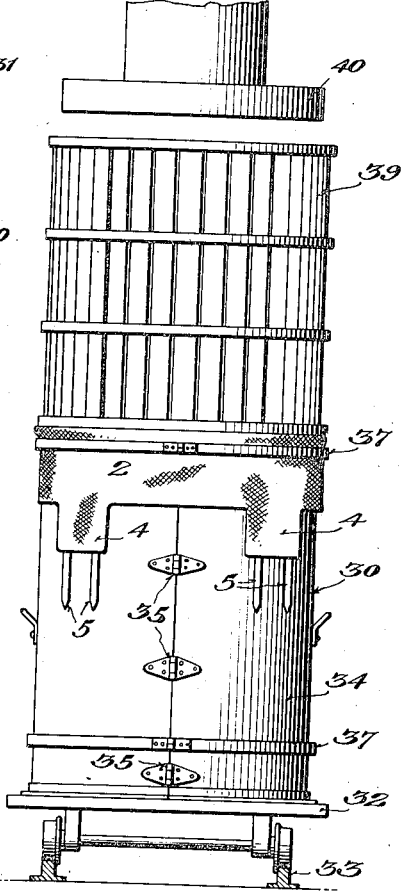
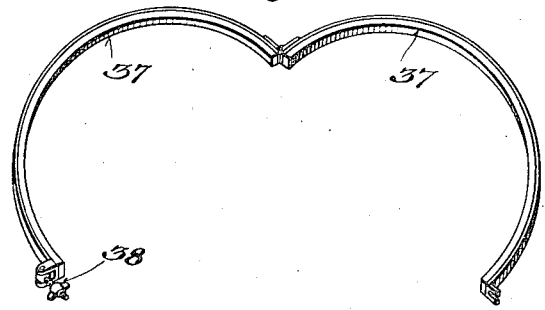
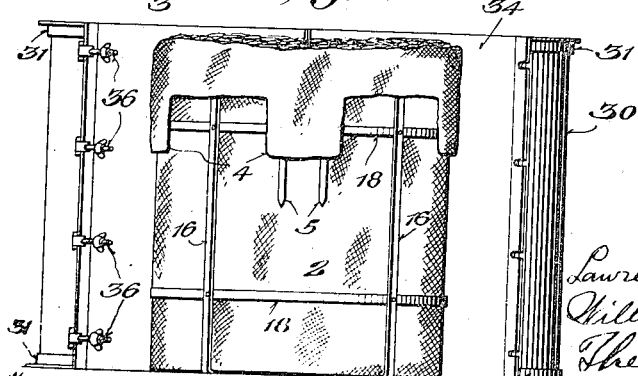

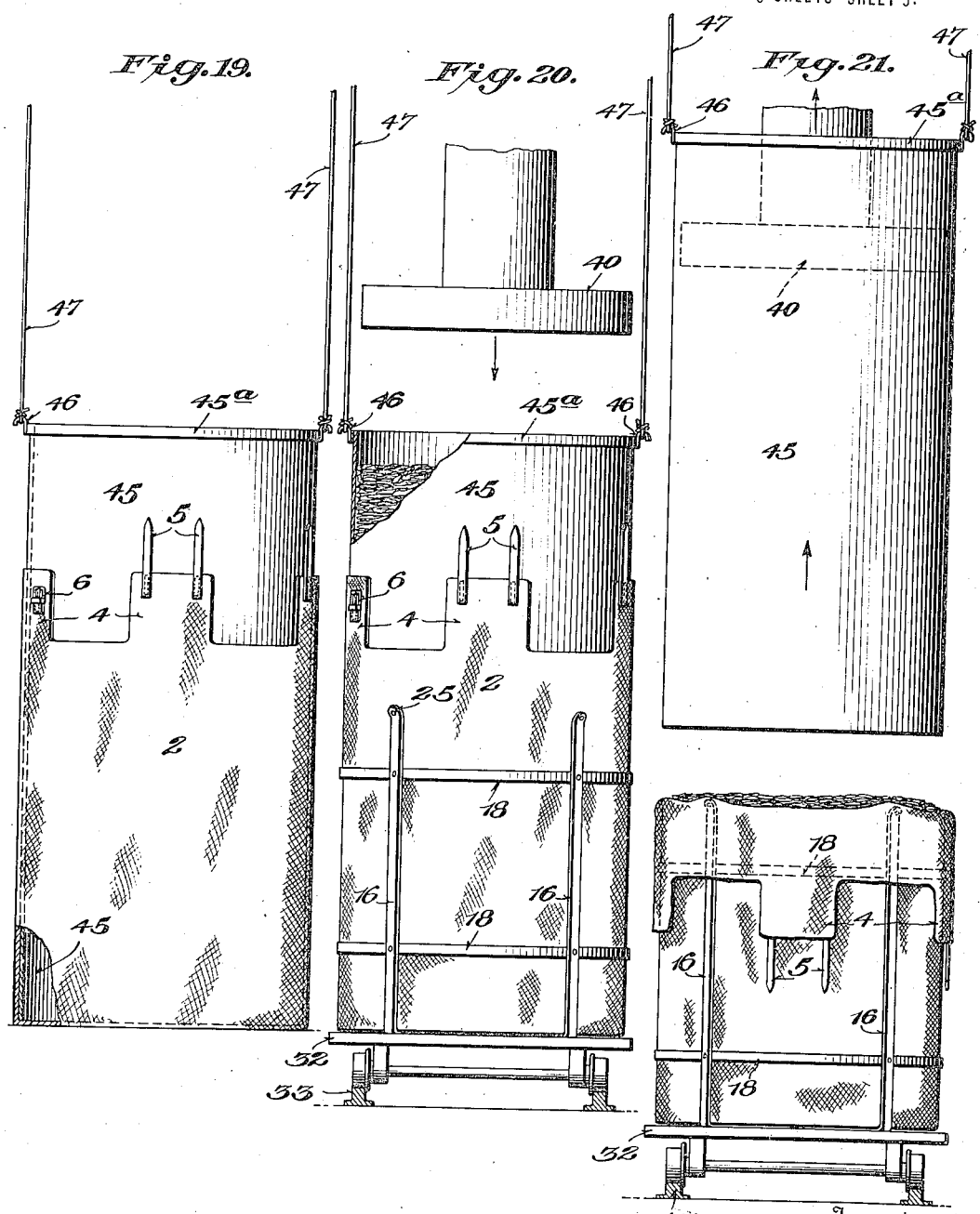

UNITED STATES PATENT OFFICE.

LAWRENCE T. O'BRYAN AND WILLIAM M. SILK, OF LOUISVILLE, AND THEODORE H. KIRK, OF LEXINGTON, KENTUCKY.

ART OF PACKING LEAF TOBACCO.

1,413,868.  Specification of Letters Patent.  Patented Apr. 25, 1922.

Application filed August 26, 1921. Serial No. 495,622.

*To all whom it may concern:*

Be it known that we, LAWRENCE T. O'BRYAN and WILLIAM M. SILK, residents of Louisville, in the county of Jefferson and State of Kentucky, and THEODORE H. KIRK, of Lexington, county of Fayette, State of Kentucky, citizens of the U. S., have invented certain new and useful Improvements in the Art of Packing Leaf Tobacco, of which the following is a specification.

The general object of the present invention is to provide improvements in the art of treating and aging tobacco leaf, including improvements in the packing of leaf tobacco, either unstemmed or stemmed, for shipping and storing in any of the customary ways, which do away with costly and inconvenient features connected with the use of wooden hogsheads, and have important additional advantages; and to provide new and improved methods of placing or packing leaf tobacco in suitable containers to form the complete tobacco bales or packages.

We have found by long study of conditions in the tobacco trade, and by experiments, that, whereas it was previously considered necessary to pack leaf tobacco for storage and shipment in a more or less stiff and rigid container, such as the typical wooden hogshead, that the wooden hogshead can be entirely eliminated and the leaf tobacco packed in substantially the same unit quantities in flexible containers of such material as canvas or other suitable fabric suitably shaped and reinforced, and which are capable of being handled, shipped and stored in the same manner as the well known hogsheads, with all the advantages in the handling and treatment of the tobacco that obtain with the wooden hogsheads, and with the further advantages that the containers in certain particular embodiments of our invention, weigh only from about thirty to forty-five pounds; that when containing a standard amount of leaf tobacco, say 750 pounds, as in the case of wooden hogsheads, they may be of such dimensions that practically double the number of bales or packages may be packed in the ordinary freight car; the containers may be knocked down, that is removed from the contents at the factories, and folded or rolled up for shipment into very compact space without any loss or wastage of their parts, and that approximately 2500 of the empty containers may be shipped back to the leaf tobacco markets for reuse, in an ordinary car.

An important object of the invention is to improve the art of packing, storing and shipping leaf tobacco in "hands," as well as in the form of strips after stemming. Tobacco in "hands" has usually been stored and shipped in wooden hogsheads of the kind previously described, the hands being laid with the leaves flat and radiating from the center with the stem ends outward. The heavy mass of tobacco thus packed retains its form and condition satisfactorily when the hogsheads are laid on their sides in rows and tiers, the strength of the wooden hogsheads being sufficient to prevent breaking down of the lowermost packages under the superposed weight. When a large number of hogsheads are stored in sheds, an important point is that they should retain their cylindrical form so that they may be easily handled and, especially in case of an emergency, so that the hogsheads may be quickly rolled away by simply removing stays which hold the lower rows. It has heretofore been considered impossible to pack tobacco for storage, otherwise than by the use of wooden hogsheads of the typical form, at any reasonable cost, since less rigid and durable containers have been considered as lacking proper strength to maintain the desired cylindrical form of the package, which would prevent it from being handled in the desired way for ordinary purposes and especially in emergencies, and it has also been considered that leaf tobacco packaged otherwise than in the wooden hogsheads does not properly age or remain in the proper condition during storage and shipment.

We have demonstrated that relative cheap, light and flexible containers (when in their unfilled condition) when properly constructed and reinforced, may be used for all the purposes and with all the advantages of wooden hogsheads, and with many additional advantages, as above briefly pointed out, and that in addition such packages will retain approximately true cylindrical form under the weight of numerous superposed rows of packages or bales and that they may be rolled in ordinary handling or an emergency with equal facility to the wooden packages.

In connection with the package and container we have devised new and improved methods of placing or packing leaf tobacco, either unstemmed in the form of hands, or stemmed in the form of strips, in the containers to form the complete tobacco bales or packages.

We will now describe certain representative leaf tobacco packages embodying the invention, and thereafter will describe certain representative ways of packing the leaf tobacco in the desired manner.

While in the present specification we use the word "package" as a desirable inclusive term for a bale, bundle or new form of "hogshead" of leaf tobacco, and while the term is not necessarily limited to any particular quantity of tobacco, we are not concerned herein especially with small packages, such as those in which tobacco is placed in manufactured condition, but are concerned with relatively large packages, usually containing several hundred pounds of contents, in which leaf tobacco is packed after it is brought into the tobacco markets for storage and aging or for storage between processing steps, and for shipment from the producing regions to the factories.

In the accompanying drawings:

Fig. 10 is a top plan of the same with the top open to show the contents, in this instance strips of leaf tobacco produced by stemming the whole leaves.

Fig. 11 is a bottom plan.

Fig. 12 is a side elevation of the container frame or reinforcement structure without the inner container or bag.

Fig. 13 is a detail view of end reinforcements or closure members.

Fig. 14 is a perspective view of the package complete, except for closing and fastening the upper end.

Figs. 15 to 21 show in a more or less diagrammatic way representative apparatus and method steps for filling the containers and producing the leaf tobacco packages illustrated in Figs. 1 to 14, inclusive.

Figure 1:
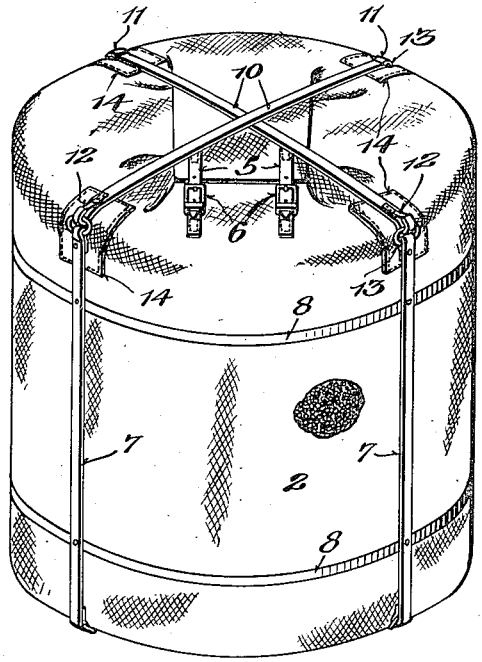
Fig. 1 is a perspective view of one form of leaf tobacco package of our invention.
Figure 2:
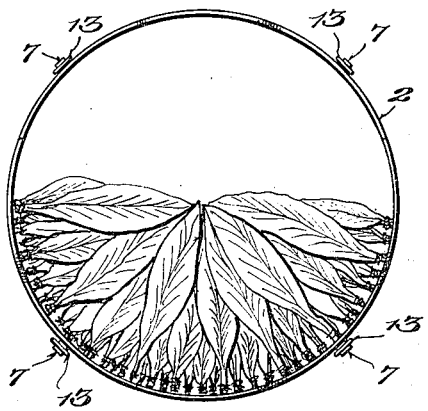
Fig. 2 is a top plan representing the package opened and showing the arrangement of unstemmed leaf tobacco in hands therein.
Figure 4:
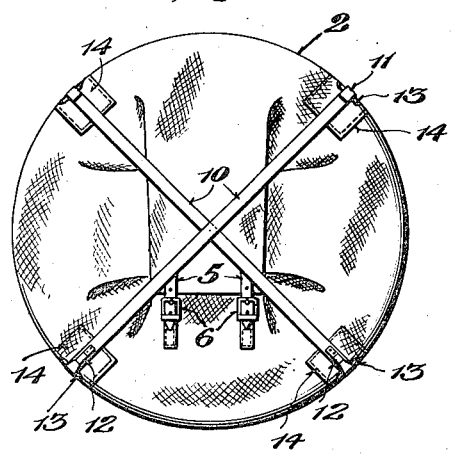
Fig. 4 is a top plan.

Fig. 1 shows a complete package embodying our invention in one desirable form. The contents as sufficiently shown in Figs. 1, 2 and 5, consists in the present instance of complete leaf tobacco arranged in hands 1, with the stem ends tied as usual, and the multiplicity of hands arranged radially in layers, as best indicated in Fig. 2. The leaf tobacco is enclosed in a bag 2 of suitable fabric, usually canvas, having a side wall of cylindrical form when set up, and usually having an approximately round bottom piece 3 sewed to the side wall. The upper part of the side wall desirably terminates in one or more flaps 4. Desirably there are four of these flaps arranged in opposite pairs, and one or both pairs of flaps may be provided with cooperating straps 5 and buckles 6. The upper margin of the bag is folded over on top of the contents and the flaps are folded over by pairs and secured by means of the straps and buckles, and where only one pair of flaps is provided with straps and buckles, the inner pair is sufficiently retained by the outer pair of flaps.

The bag is provided with stiffening or reinforcing devices which may vary considerably. In the present instance vertical or longitudinal strips 7 of multiply canvas, webbing, or other suitable material, are riveted or sewed along the side wall of the bag. Desirably there are four of these longitudinal reinforcements equally spaced about the cylindrical periphery of the bag. The bag is also desirably circumferentially reinforced by strips or straps 8 of suitable material, usually similar to that employed for the longitudinal straps. In some cases the circumferential straps 8 may be interrupted at one point and the ends connected by buckles as at 9 so that these straps may be tightened or adjusted as may be desirable, but in many cases such tightening devices may be dispensed with.

Figure 3:
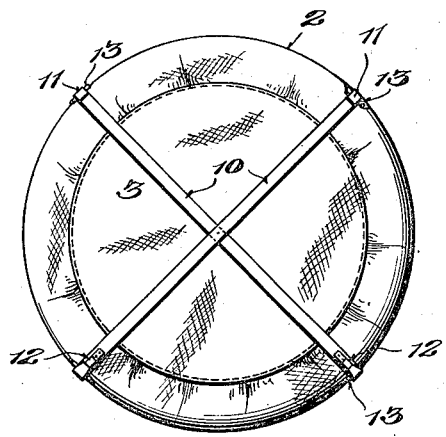
Fig. 3 is a bottom plan of the package.
Figure 5:
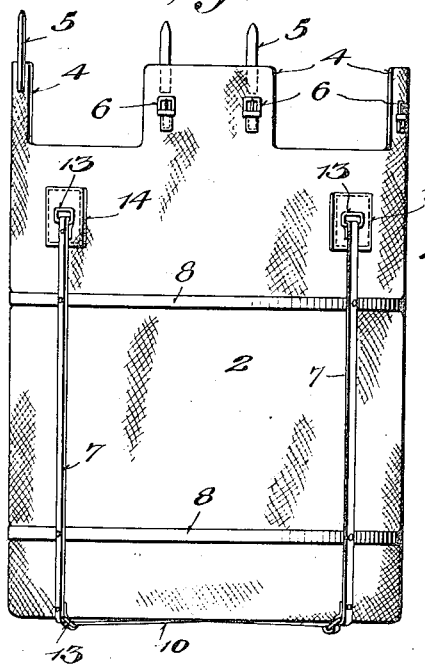
Fig. 5 is a side perspective of the package with the top flaps open.

In some cases the longitudinal straps 7 may be extended across the bottom of the bag, but it is usually desirable to provide other or more rigid bottom reinforcements, such as the metal bars or strips 10. Usually a pair of these is provided for the bottom of the package. Each strip is arranged to be connected to two of the opposite longitudinal straps 7, and desirably is also arranged to be detached at one or both ends for convenience in rolling or packing the containers for shipment when empty. For this purpose each strip 10 has at one end an eye 11 and at the other end a snap hook 12. The eyes 11 of a pair of metal strips are secured to rings 13, which are secured to the lower ends of two adjacent straps 7, and the snap hooks 12 of the strips are secured to similar rings of two other adjacent straps so that, as best shown in Fig. 3, the two metal rods cross each other at the center of the package bottom. A suitable top closure and reinforcement is also provided, consisting in the present instance of similar metal rods or strips 10, arranged and secured over the upper end flaps of the bag in a similar way, as sufficiently indicated by similar reference characters. Desirably reinforcements such as canvas patches 14, may be secured to the bag underneath the rings 13 to take care of wear occasioned by the hooks or eyes of the metal end strips inserted in the rings. The longitudinal strips 7 with their rings and the end bars or rods 10 are desirably so dimensioned and positioned that when the end strips are put in position they are bent laterally, as shown in Figs. 1 and 5, and the entire package is thus placed under tension pressure due to the resiliency of the end strips, this pressure being exerted in longitudinal directions to firmly compress and retain the contents and reinforce the bag. Circumferential strain is taken up by the circumferential straps 8. The completed package made up as described, with the leaf tobacco or hands properly compressed within the bag, is in substantially cylindrical form, and is amply strong and rigid to retain this form under any conditions met with in practice. It is in some respects equivalent to a wooden hogshead of leaf tobacco and may be handled in the same way with equally good results, but with the added advantages that the package in both its transverse and longitudinal dimensions is smaller than the wooden hogshead, the reduction in these dimensions being substantially equal to the difference in thickness at the side and end walls of the container. Or otherwise stated, the thickness of the container in the case of our package, consisting substantially only of the thickness of the canvas bag in the transverse direction and in the longitudinal direction consisting only of two or three plies of canvas, (since the metal end strips imbed themselves to considerable extent in the ends of the package and do not protrude to any material degree), is practically negligible, and the overall dimensions of the package are not materially greater than the dimensions of the tobacco contents. When the same amount of leaf tobacco, say about 750 pounds, is packaged as is customary with the wooden hogshead, the gross weight of the package is increased in the case of the described structure, by only approximately thirty pounds, representing a net saving in weight as compared with the wooden package of 160 pounds. The overall dimensions are also reduced to such an extent that as previously stated, practically double the number of bundles or packages may be placed in an ordinary car as is the case with the wooden hogsheads.

Figure 8:
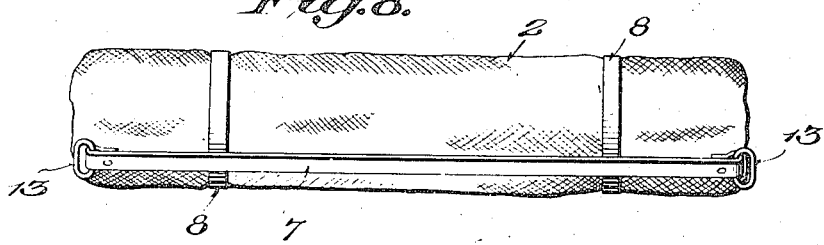
Fig. 8 is a perspective view of the container shown in previous views, "knocked down" or arranged for shipment.

When the tobacco is first packaged for storage, for instance in the typical storage sheds, the bundles may be placed in tiers on their sides, as usual, and they are not appreciably deformed by the weight of superposed packages and may be rolled into place and rolled away in ordinary procedure or in emergencies, for instance, to salvage the tobacco in case of fire, as easily as the typical hogsheads, and with less risk of breakage or other injury. When the bundles are shipped to the manufacturing points they may be quickly opened in an obvious way, and after the metal end strips are loosened or in some cases only the top end strips, the entire container may be easily stripped off from the contents, leaving in the present case, the multiplicity of hands of tobacco, standing in a pile, when it is desired to manipulate the package in this manner. The container is then rolled up into compact form for reshipment to the producing centers, one convenient method of arranging the container for reshipment being indicated in Fig. 8, where the bag is folded or rolled longitudinally with the metal end strips also laid alongside the folded bag, the whole constituting a bundle or roll of very small diameter or thickness. About 2500 of the containers so folded may be shipped in a single ordinary freight car.

Figs. 9 to 14, inclusive show another package embodying the invention. In this case the bag 2 is substantially the same as sufficiently indicated by similar reference characters. The bag is shown as enclosing the contents, consisting of tobacco strips 15, but the contents may also be in this case hands of tobacco arranged as previously described, and similarly, strip tobacco may be packaged in the container described with reference to Figs. 1 to 8, inclusive.

Figure 9:
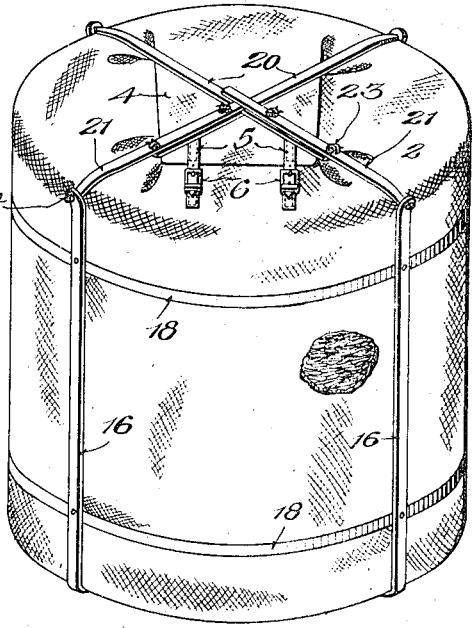
Fig. 9 is a perspective view of somewhat different form of package.
Figure 6:
Figs. 6 and 7 are detail views of end closures or reinforcements.
Figure 7:

In the present instance the bag is enclosed and reinforced by a substantially separate reinforcing structure shown in Fig. 12, which may consist of longitudinal or side bars or metal strips 16, and each two opposite strips may conveniently be connected to form a substantially U-shaped piece, or as particularly shown in Fig. 11, the ends of the side strips 16 are bent inward at the bottom and all the ends are connected to a center plate 17. The longitudinal or side strips 16 are connected together by circumferential strips or straps 18, which may be of multiply canvas or webbing, or in some cases may be metal hoops or bands. In the particular instance shown the circumferential straps 18 are of canvas or webbing and are riveted to or about the longitudinal strips 16 at the intersecting points. A top closure or reinforcement is provided, consisting of two pairs of metal rods or strips, Fig. 13, each pair comprising a strip 20 and another strip 21. One of the strips 21, is provided with apertures and the other strip 20 is provided with lugs 22 and 23, arranged to pass through the apertures of strip 21, and cotter pins 24 are passed through holes in the lugs to lock the two strips of the pair together. The outer end of each strip is bent upward as at 24 and these bent ends are inserted in holes 25 in the upper ends of strips 16. After the package has otherwise been completed in the same way as described in connection with the first form of the invention the bent ends 24 of one pair of fastening strips are inserted in the holes 25 of two opposite strips 16 and the two strips 20 and 21 are then locked together in the manner previously indicated. The other pair of locking strips are then put in position and secured together, this pair crossing over the first pair at the center of the package top, as shown in Fig. 9. The side strips 16 are so dimensioned and their holes 25 are so located that when the end locking strips are in position the strips are bent in substantially the same way as described in connection with the locking strips 10, Fig. 1, to put a yielding and constant pressure upon the package and retain it solidly in shape.

This particular form of package has characteristics in general similar to those of the form first described. The package may be handled in substantially the same way and with the same advantages. Owing to the fact that more metal parts are used in this particular form of the invention the weight of the container, aside from the package contents, is usually somewhat greater than in the first instance. For example in a particular case the container proper may weigh approximately 45 pounds, but in any case containers embodying our invention are very much lighter than the wooden hogsheads.

Our invention also includes a method of packing leaf tobacco, the method being usually employed in connection with containers such as those described, to produce leaf-tobacco packages represented by the previous examples. The packing process may be perfomed in different ways, and is sufficiently represented in the two methods of procedure now to be described.

A container or bag 2 such as described above is "set up" with its top open, and supported by suitable means, such as a "holder" or "form" 30, Figs. 15, 17 and 18. This support in the present instance is, substantially, an open-ended cylinder of sheet metal, suitably reinforced with strips 31, and the bag 2 is placed within the cylinder, and the bag and cylinder are placed on a suitable support or base 32, which may be provided with wheels or otherwise arranged for convenient movement to and from a press, for instance by sliding or rolling along rails 33. The form, or retaining cylinder, may conveniently be made in two semi-cylindrical sections 34, connected along two adjacent edges by hinges 35, and detachably connected along the other two edges by suitable means, such as swing-bolts 36. The upper part of the bag side wall is usually turned down about the upper part of the form, as shown in Fig. 17. The form cylinder may be additionally reinforced by one or more detachable hinged bands 37, provided with swing-bolts 38 for ready clamping, and one of these is placed about the upper part of the form, over the down-turned bag margin, to secure the latter tightly in place, and when another reinforcing band is used, it may be placed about the lower end of the cylinder.

The leaf tobacco is now packed in the bag, and since this material is, either in hands of whole leaves, or in strips, compressible to a marked degree, a filling extension, such as a cylindrical, open-ended crate 39, is usually placed on the upper end of the cylinder at a suitable stage of the filling process. When the tobacco is in "hands," it is packed within the bag in layers with the individual hands radiating from the center and with their stem ends outward, as sufficiently described previously and best illustrated in Fig. 2. The form extension 39 is in this instance, usually put in position only when the level of leaf tobacco reaches a point near the upward end of the bag and thereafter the packing continues within the crate to the proper level. The base 32 with the supported bag and crate is run under any suitable press, usually a hydraulic press having a plunger 40, Fig. 17, and the plunger is moved down within the crate or form extension 39 and the layers of leaf tobacco are pressed down into a compact mass to substantially the level of the top of the bag. The plunger is then withdrawn and the crate removed, upper band 37 is removed and the upper portion of the bag is stripped up off of the form 30 and folded over the top of the compressed contents; the flaps 4 are folded over and secured in the previously described manner. When a lower reinforcing band 37 is employed, it is removed; the spring bolts 36 are loosened and the form 30 is opened, as indicated in Fig. 18, to free the package. While the package top is usually closed, as previously described, at the stage of the process indicated in Fig. 18, the bag top is there shown open to disclose the contents. The end closures, consisting of the metal bars or strips 10 are then fastened by laying them across the ends of the package and snapping their snap hooks 12 into appropriate wings 13, and the package is then completed, as illustrated in Fig. 1. The endwise compression of the package contents is retained by the end strips 10. In case of leaf tobacco in hands the leaves are thus retained in firm flatwise contact and when so held they have great longitudinal rigidity, the outwardly presented stem ends being held firmly in a substantially cylindrical contour within the cylindrical side wall of the bag. The compressed contents reinforced by the bag thus effectively resist any compression exerted transversely of the package, as for instance, when the bales are laid on their sides with a number of others piled on top, and so there is no crushing down or bending of the leaves in the direction of their length and the package is maintained firmly in its substantially cylindrical form. The particular performance of the process explained above is described in connection with the packaging of leaf tobacco in hands, but it may also be carried out in substantially the same way with strip tobacco, except that in this case the tobacco strips are simply placed in the bag and in the filling extension 39 up to the proper level without such particular regard to the flatwise arrangement of the leaf, and the extension 39 may be put in position before the filling of the container begins. While the process steps have been described in a particular order, the invention is not limited to that particular order of operation, since the sequence of steps may be varied in some cases.

Figs. 19, 20 and 21 show a variation of the method adapted particularly for the form of package shown in Figs. 9 to 14. A filling tube or guide 45 provided with hooks 46 for the connection of hoisting chains 47, is inserted in the bag 2 and the bag is supported about the filling tube by the bag reinforcing frame work 16—18, etc., previously described. In some cases after the tube and frame work are in position in relation to the bag, the upper end of the bag is turned down over the frame work as in Fig. 21. Hands of tobacco are placed in layers within the filling tube up to the proper level in the same way as previously described, or strip tobacco is placed within the tube up to a suitable level and the associated filling tube bag and frame work 16—18 are brought under a pressing plunger 40 and the tobacco contents is compressed within the filling tube; the plunger is then withdrawn and the filling tube is withdrawn, as indicated in Fig. 21, leaving the compressed tobacco contents of the bag ready to be secured by folding over the upper bag end portions and applying the end reinforcements or compression rods, as previously described.

In either of the particular examples given, the filling method consists, in a broad way, of supporting a collapsible bag in position for filling, in applying to the bag means for resisting expansive force of the tobacco contents during compression, in placing the leaf tobacco within the bag, and guiding and supporting additional leaf tobacco in proper arrangement above the upper end of the bag to allow for subsequent compression, then compressing the contents down to the proper point within the bag, withdrawing or removing the devices to reinforce the bag or resist outward expansion of the tobacco and closing the bag, the order of the two last operations being varied in different cases, and finally in some cases applying end reinforcements to the filled bag.

As to the package itself the invention consists broadly in providing a flexible or collapsible fabric container for a relatively large and heavy mass of leaf tobacco in the forms of hands or strips, the contents being compressed and retained in the bag in substantially cylindrical form, and the bag being provided with suitable reinforcements or retaining devices for maintaining the form of the package and retaining the compression of the contents, desirably with yielding or resilient force applied especially to the ends of the package.

What we claim is:—

1. In the art of packing leaf tobacco, a package comprising a mass of compressed leaf tobacco in substantially cylindrical form, a fabric container closely enclosing the tobacco mass, and reinforcing means retaining the package under compression and in cylindrical form.

2. In the art of packaging leaf tobacco, a package comprising a longitudinally compressed cylindrical mass of hands of tobacco arranged in layers flatwise and radially with stem ends outward, and a close-fitting fabric container, the container being provided with form retaining reinforcements.

3. In the art of packing leaf tobacco, in units of large volume and weight, a package comprising a mass of compressed leaf tobacco in approximately cylindrical form, a fabric container closely enclosing the tobacco, container reinforcements, and end members connected with the container and exerting resilient compressive force at the ends of the package.

4. In the art of packing leaf tobacco in units of large volume and weight, a package comprising a mass of compressed leaf tobacco in approximately cylindrical form, a fabric container closely enclosing the tobacco, longitudinal container reinforcements, and resilient end members connected with the container reinforcements and exerting yielding compressive force at the ends of the package.

5. In the art of packing masses of leaf tobacco of substantial size and weight, a package comprising a bag having an open end and closely enclosing a substantially cylindrical mass of compressed leaf tobacco, the open bag end being folded closely over one end of the contents, and crossed end closure members resiliently engaging the bag ends and exerting compressing force against the contents.

6. In the art of packaging masses of leaf tobacco of substantial size and weight, a package comprising a bag having an open end and closely enclosing a substantially cylindrical mass of compressed leaf tobacco, the open bag end being folded closely over one end of the contents, end closure members resiliently engaging the bag ends and exerting compressing force against the contents and longitudinal bag reinforcements connected with ends of the end closure members.

7. In the art of packing masses of leaf tobacco of substantial size and weight, a package comprising a fabric bag in substantially cylindrical form having one open end provided with a flap, the bag containing a relatively large amount of compressed leaf tobacco forming a cylindrical mass closely enclosed by the bag, the open end of the bag and flap being folded and secured over one end of the tobacco contents, and external reinforcements comprising longitudinal members and resilient transversely arranged end members having their ends connected to certain of the longitudinal reinforcing members.

8. In the art of packing masses of leaf tobacco of substantial size and weight, a package comprising a fabric bag in substantially cylindrical form having one open end provided with opposed flaps, a bag containing a relatively large quantity of compressed leaf tobacco in hands packed radially and flatwise with the stem ends outward, forming a cylindrical mass closely enclosed by the bag, the open end portion and flaps being folded over one end of the tobacco contents, and the flap being detachably secured, and external reinforcements comprising longitudinal members, circumferential members and resilient transversely arranged end members having their ends detachably connected to certain of the longitudinal reinforcing members.

9. In the art of packaging leaf tobacco, a package comprising a substantially cylindrical mass of compressed leaf tobacco, a bag closely enclosing the tobacco, longitudinal reinforcing straps secured to the side wall of the bag, rings inserted in the ends of the straps, and end reinforcements, one for each end of the bag and including separate transversely arranged resilient metal strips, each strip having its ends engaged with two opposite ones of said rings, the connection of the metal strips with certain of the rings being detachable.

10. In the art of packaging leaf tobacco, a package comprising a substantially cylindrical mass of compressed leaf tobacco, a bag closely enclosing the tobacco, longitudinal reinforcing straps secured to the side wall of the bag, rings inserted in the ends of the straps, circumferential reinforcing straps secured to the bag side wall, and end reinforcements, one for each end of the bag and including separate transversely arranged resilient metal strips, each strip having its ends engaged with two opposite ones of said rings, the connection of the metal strips with certain of the rings being detachable.

11. In the art of packaging leaf tobacco in the form of cylindrical and compressed bales, a fabric container of substantially cylindrical form having one end closed, closure flaps at the other end, and longitudinal side reinforcing strips, and end reinforcing members adapted to be connected to the side reinforcing strips.

12. In the art of packaging leaf tobacco in the form of cylindrical and compressed bales, a fabric container of substantially cylindrical form having a closed base, closure flaps at the other end, longitudinal side reinforcing strips and circumferential reinforcements, and reinforcing members adapted to be connected to the side reinforcing strips and crossed over the closed ends.

13. In the art of packing leaf tobacco in units of substantial size and weight for storage or shipment, a packing method comprising supporting a collapsible fabric container of substantially cylindrical form with an open end, applying means to resist outward expansion of the container contents during compression, inserting and piling leaf tobacco to a point considerably above the level of the container top, supporting and guiding the extended contents prior to compression, compressing the entire tobacco contents to a point below the end closing portions of the container, withdrawing the guiding and expansion resisting means, and closing the container, to form a substantially cylindrical package.

14. In the art of packing leaf tobacco in units of substantial size and weight for storage or shipment, a method of packing comprising supporting a collapsible fabric container of substantially cylindrical form with an open end, applying means to resist outward expansion of the container contents during compression, inserting and piling leaf tobacco to a point considerably above the level of the container top, supporting and guiding the extended contents, compressing the contents to a point below the upper end closing portions of the container, withdrawing the guiding and expansion resisting means, closing the container, and applying end reinforcements to maintain the package in substantially cylindrical form and compression.

15. In the art of packing leaf tobacco in units of substantial size and weight for storage or shipment, a method comprising supporting a collapsible fabric bag of substantially cylindrical form with an open end, applying means to resist outward expansion of the bag contents during compression, inserting leaf tobacco in radially arranged "hands" lying flatwise with stem ends outward to fill the cylindrical contour of the bag and extending to a point considerably above the level of the bag top as supported for filling, guiding and supporting the extended contents prior to compression, compressing the tobacco contents to a point below the upper end closing portions of the bag, withdrawing the guiding and expansion resisting means, and closing the bag, to form a substantially cylindrical package.

16. In the art of packing leaf tobacco in units of substantial size and weight for storage or shipment, a method comprising supporting a collapsible fabric bag of substantially cylindrical form with open upper end, applying means to resist outward expansion of the bag contents during compression, inserting leaf tobacco in radially arranged "hands" lying flatwise with stem ends outward to substantially fill the cylindrical contour of the bag and extending to a point considerably above the upper end of the bag as supported for filling, guiding and supporting the extended contents, compressing the tobacco contents to a point below the upper end closing portions of the bag, withdrawing the guiding and expansion resisting means, closing the bag, and applying end reinforcements to maintain the cylindrical form of the completed package and retain the contents in compression.

17. In the art of packing leaf tobacco, a package adapted for storing and shipping tobacco in large units and comprising a substantially cylindrical compressed mass of leaf tobacco, a fabric bag closely enclosing the tobacco and having an open end, the parts whereof are folded over the tobacco mass, the bag also having longitudinal reinforcing straps, rings secured to the ends of said straps and located somewhat inwardly from the package-end limits, and end-retaining means comprising resilient metal strips of substantial cross-section, at least two of the strips being placed at the package end in crossed relation, the strips being flexed and the ends of each being connected to two substantially opposite rings, whereby the package is retained in compressed and cylindrical form.

18. In the art of packing and storing leaf tobacco, a package adapted for storing and shipping tobacco in comparatively large units and comprising a substantially cylindrical mass of unstemmed leaf tobacco in "hands" arranged flatwise and radially with stem ends outward, the mass being compressed in the direction of the cylinder-axis, a strong fabric bag closely enclosing the tobacco mass and having an open end the parts whereof are folded over the tobacco mass, the bag also having longitudinal reinforcing straps, rings secured to the ends of said straps and located somewhat inwardly from the package ends, and end-retaining means comprising resilient metal strips of substantial cross-section, at least two of the strips being placed at the package end in crossed relation, the strips being flexed and the ends of each being connected to two substantially opposite rings, whereby the package is maintained in compressed and cylindrical form.

Signed at Lexington, in the county of Fayette and State of Kentucky, this 13th day of August A. D. 1921.

LAWRENCE T. O'BRYAN.
WILLIAM M. SILK.
THEODORE H. KIRK.